(12) United States Patent
Sugiyama

(10) Patent No.: US 12,019,364 B2
(45) Date of Patent: Jun. 25, 2024

(54) PROJECTION DEVICE

(71) Applicant: CASIO COMPUTER CO., LTD., Tokyo (JP)

(72) Inventor: Chihaya Sugiyama, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 18/135,605

(22) Filed: Apr. 17, 2023

(65) Prior Publication Data

US 2023/0251561 A1 Aug. 10, 2023

Related U.S. Application Data

(63) Continuation of application No. 17/464,126, filed on Sep. 1, 2021, now Pat. No. 11,656,543.

(30) Foreign Application Priority Data

Sep. 10, 2020 (JP) ................... 2020-151706

(51) Int. Cl.
*G03B 33/12* (2006.01)
*G02B 26/00* (2006.01)
*G02B 27/30* (2006.01)
*G03B 21/20* (2006.01)

(52) U.S. Cl.
CPC .......... *G03B 33/12* (2013.01); *G02B 26/008* (2013.01); *G02B 27/30* (2013.01); *G03B 21/204* (2013.01); *G03B 21/2066* (2013.01)

(58) Field of Classification Search
None
See application file for complete search history.

(56) References Cited

U.S. PATENT DOCUMENTS

2012/0176809 A1* 7/2012 Ohno ................ F21V 5/04
362/510
2013/0188377 A1 7/2013 Konishi

FOREIGN PATENT DOCUMENTS

| JP | H04-32814 A | 2/1992 |
| JP | 2009-238469 A | 10/2009 |
| JP | 2016-057375 A | 4/2016 |
| JP | 2016-62012 A | 4/2016 |
| JP | 2016-200979 A | 12/2016 |
| JP | 2017-116905 A | 6/2017 |
| JP | 2017-199586 A | 11/2017 |
| JP | 6498474 B2 | 4/2019 |
| JP | 2020-30281 A | 2/2020 |
| JP | 2020-98313 A | 6/2020 |

OTHER PUBLICATIONS

JPO; Application No. 2020-151706; Notice of Reasons for Refusal dated Aug. 30, 2022.
JPO; Application No. 2022-187028; Notice of Reasons for Refusal dated Nov. 7, 2023.

* cited by examiner

*Primary Examiner* — Bao-Luan Q Le
*Assistant Examiner* — Danell L Owens
(74) *Attorney, Agent, or Firm* — Fitch, Even, Tabin & Flannery LLP

(57) ABSTRACT

A projection device includes an optical lens and a light source. The optical lens has an incident surface of light, a reflecting surface that has a concave curved surface and internally reflects light that has entered through the incident surface, and an exit surface of light that has been reflected by the reflecting surface. The light source that emits light that enters the optical lens.

13 Claims, 3 Drawing Sheets

PROJECTION DEVICE

CROSS-REFERENCE TO RELATED APPLICATIONS

This application is a continuation of U.S. patent application Ser. No. 17/464,126 filed Sep. 1, 2021, and claims the benefit of priority from Japanese Patent Application No. 2020-151706 filed on Sep. 10, 2020, the entire contents of which are incorporated herein by reference.

BACKGROUND

Technical Field

The technical field relates to a projection device.

Description of Related Art

Conventionally, there is a light source device that adjusts direction of light rays emitted by a light source in an appropriate direction and outputs it with high directionality. In a device that outputs desired color images, such as a projector, light of multiple wavelength bands is combined and output. JP 2016-57375 A discloses a projector that diffuses a part of light emitted by a laser light source of a blue wavelength band, converts the rest of the light into light of a green wavelength band using phosphors, and then combines them again for output.

SUMMARY

According to an aspect of the present disclosure, there is provided a projection device including:
an optical lens that has an incident surface of light, a reflecting surface that has a concave curved surface and internally reflects light that has entered through the incident surface, and an exit surface of light that has been reflected by the reflecting surface; and
a light source that emits light that enters the optical lens.

BRIEF DESCRIPTION OF DRAWINGS

The accompanying drawings, which are incorporated in and constitute a part of the specification, illustrate embodiments, and together with the general description given above and the detailed description of the embodiments given below, serve to explain the principles of the present disclosure, wherein.

DETAILED DESCRIPTION

In the followings, an embodiment of a projection device will be described.

Figure 1:
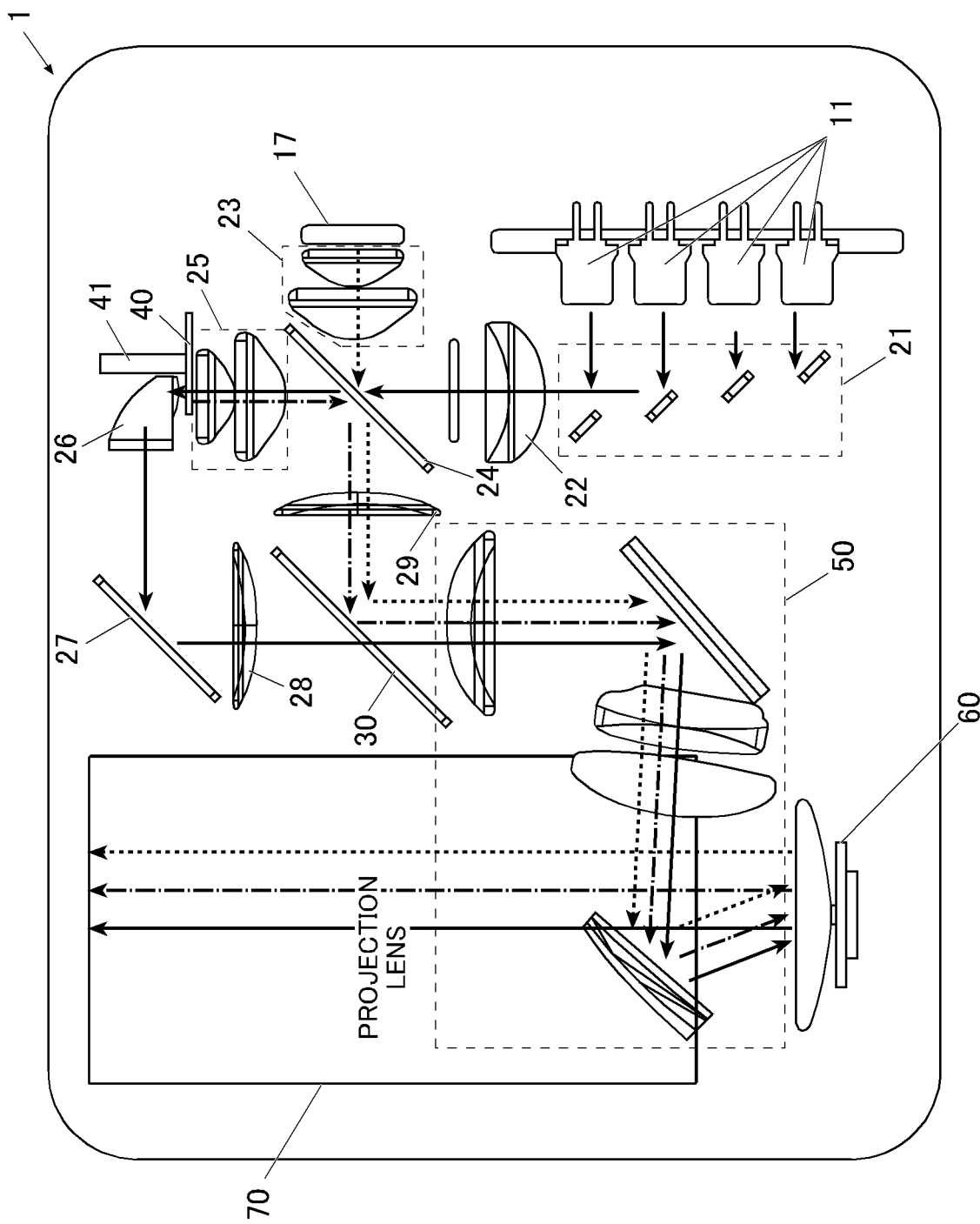
FIG. 1 is a diagram illustrating configurations of a projector and light emission paths.

FIG. 1 is a diagram of the projection device of this embodiment, explaining configurations of a projector 1 including a light source device and the light output path.

The projector 1, which is a projection device, includes a laser diode (LD11; light source) and a light-emitting diode (LED17) as light sources, and emits light of RGB colors using these light sources. The LD11 emits light of a blue wavelength band. Here, for example, four TO-CAN type LDs 11 are aligned and emit parallel rays of light. An LED 17 emits light of a red wavelength band. The light of a green wavelength band is obtained by a phosphor based on the light of the blue wavelength band, as described later. In FIG. 1, the light path of the blue wavelength band is shown with solid arrows, the light path of the green wavelength band is shown with dashed-dotted arrows, and the light path of the red wavelength band is shown with dashed arrows.

Various optical devices are located on the optical paths. The optical devices here include a reflective mirror group 21, a collimating lens 22, collimating lens groups 23, 25, 28, 29, dichroic filters 24, 30, an irregular-shaped lens 26, a reflective mirror 27, and the like. On the light path of the blue wavelength band, a fluorescent wheel 40 is located.

After the light of the three wavelength bands has been combined (merged) by the dichroic filter 30, the light is emitted through the merged light guide 50, a display element 60, and a projection lens group 70. The merged light guide 50 reflects the merged parallel rays of light of respective wavelength bands in an appropriate direction and guides it to the display element 60.

The display element 60 is a spatial optical modulator (SOM), for example, a digital micromirror device (DMD). The DMD switches tilt angles of respective micromirrors arranged in an array at high speed one by one, determines whether or not light is reflected toward the projection lens group 70 for each pixel unit or each image frame unit, and forms an optical image with the reflected light.

The projection lens group 70 guides and emits the optical image emitted by the display element 60 in the output direction. The projection lens group 70 includes a plurality of lenses whose combination or positional relationship can be changed such that its focal position, the magnification (zoom) of the output image, and the like can be adjusted.

The fluorescent wheel 40 is a circular metal plate that has an area with a phosphor layer and a diffusion transmission surface. When the phosphor layer is irradiated with light of the blue wavelength band, light of the green wavelength band is excited and emitted. The diffusion transmission surface transmits the light of the blue wavelength band while diffusing it. The fluorescent wheel 40 is rotatably driven by a motor 41. As a result, the fluorescent wheel 40 emits light of the green wavelength band (of a different wavelength) based on a part of the light of the blue wavelength band, and causes light other than the part to enter the diffusion transmission surface as it is.

The diffused and transmitted light of the blue wavelength band enters the irregular-shaped lens 26, passes through the reflective mirror 27, the collimating lens 28, and then the dichroic filter (second dichroic filter) 30 (first light guide), and is guided to the merged light guide 50. The light of the green wavelength band emitted from the phosphor layer returns to the collimating lens group 25, is reflected by the dichroic filter 24 (first dichroic filter), passes through the collimating lens 29, is then reflected by the dichroic filter 30 (second light guide), and is guided to the merged light guide 50.

The light of the red wavelength band that is emitted by the LED 17 and is less diffused because of the collimating lens group 23, passes through the dichroic filter 24, is then reflected by the dichroic filter 30, and is guided to the merged light guide 50.

In other words, the dichroic filter 24 transmits the light of the blue and red wavelength bands and selectively reflects the light of the green wavelength band. The dichroic filter 30 selectively transmits the light of the blue wavelength band and reflects the light of the green and red wavelength bands.

The light source device of this embodiment includes, among the above-described configurations, those along the respective paths of light of the blue wavelength band and the light of the green wavelength band from LD 11 where light of the blue wavelength band is emitted, to the dichroic filter 30 where light of the blue and green wavelength bands are combined, in particular, the fluorescent wheel 40, the motor 41, and the irregular-shaped lens 26.

Next, the irregular-shaped lens 26, which is an optical lens of this embodiment, will be explained.

Figure 2A:
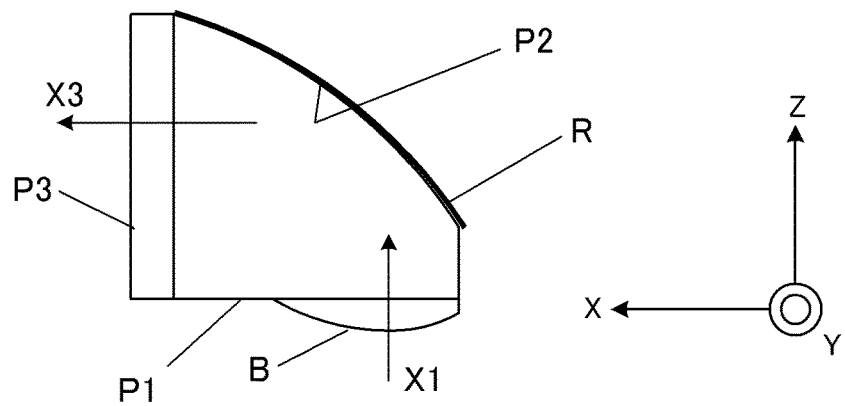
FIG. 2A is a diagram illustrating an irregular-shaped lens.
Figure 2B:
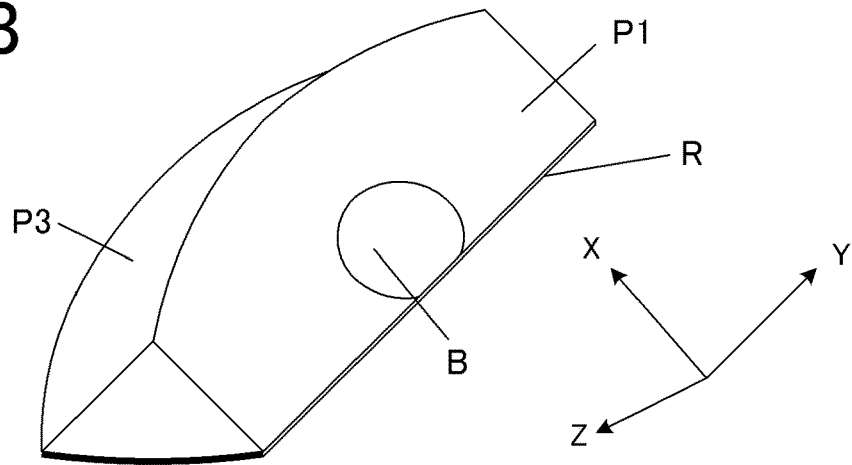
FIG. 2B is a diagram illustrating the irregular-shaped lens.

FIG. 2A to FIG. 2B show the irregular-shaped lens 26.

As shown in FIG. 2A, the irregular-shaped lens 26 is different from other lenses in that its optical axis on a side of an incident surface P1 (incident optical axis X1) is oriented differently from its optical axis on a side of an exit surface P3 (outgoing optical axis X3). Here, the incident optical axis X1 (here, along the Z direction) and the outgoing optical axis X3 (here, along the X direction) are perpendicular to each other. The irregular-shaped lens 26 has a reflecting surface P2 at which orientation of the optical axis changes inside the irregular-shaped lens 26.

Figure 2C:
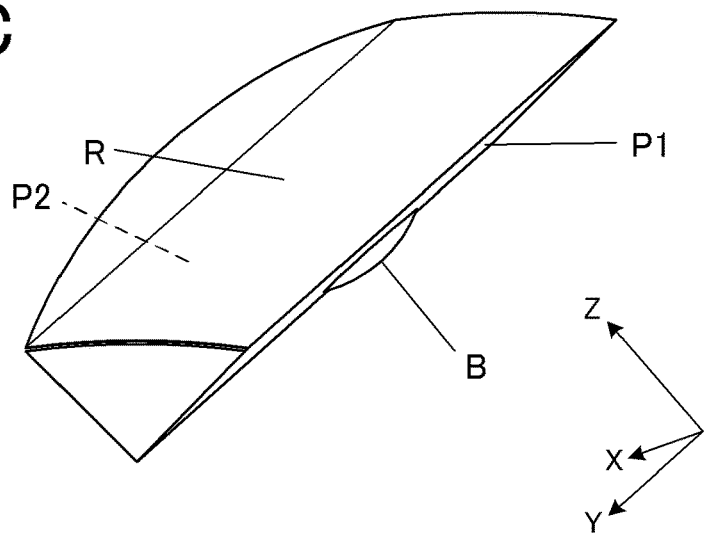
FIG. 2C is a diagram illustrating the irregular-shaped lens.

As shown in FIG. 2B, FIG. 2C, etc., the incident surface P1 has a convex portion B (protrusion) that protrudes from a flat surface. The convex portion B has a spherical surface (three-dimensional shape of a spherical cap) and functions as a convex lens that collimates the incident light. Here, the convex portion B has a shape (curvature) that at least reduces diffusion of the light that has been transmitted while being diffused through the diffusion transmission surface of the fluorescent wheel 40. The position and size of the convex portion B are determined such that almost all the light of the blue wavelength band from the diffusion transmission surface of the fluorescent wheel 40 enters the convex portion B.

The incident light entering the irregular-shaped lens 26 through the incident surface P1 is reflected by the reflecting surface P2 in the irregular-shaped lens 26. The reflecting surface P2 has a concave curved surface (convex shape when viewed from the outside) having a shape formed by extending a quadratic curve perpendicular to a plane on which the quadratic curve is present. Here, the reflecting surface P2 has a shape of a portion of a cylinder surface (quadratically curved surface). The cross section of the curved surface cut by a plane parallel to the incident optical axis X1 and the outgoing optical axis X3 (XZ plane or first plane) has a shape of a quadratic curve having a focus on the diffusion transmission surface of the fluorescent wheel 40, for example, a parabola shape. The reflection surface P2 extends in a straight line in the direction perpendicular to both the incident optical axis X1 and the outgoing optical axis X3 (Y-axis direction, normal to the first surface). The irregular-shaped lens 26 is made of optical glass whose refractive index is approximately 1.5. The reflecting surface P2 is oriented depending on the material so that most of the incident light is totally reflected. However, because not all the incident light is reflected depending on the direction of the incident light, the irregular-shaped lens 26 may have a reflective layer R on the outer side of the reflecting surface P2. Depending on an incident angle on the incident surface P1, positional relationship between the incident surface P1 and the reflecting surface P2, and the refractive index, the area in the reflecting surface P2 where total reflection may not occur is limited. Therefore, the reflective layer R does not need to cover the entire outer surface of the reflecting surface P2, but only needs to be provided in such a way that reflection occurs with a small loss in the area where total reflection does not occur. Because of the reflecting surface P2 shaped as described above, the incident light is collimated (diffusion is suppressed) in the XZ plane (first plane) in the direction of the outgoing optical axis X3.

The convex portion B is sized and located such that the incident light on the incident surface P1 can efficiently strike the appropriate area of the reflecting surface P2. Here, the convex portion B is located at the center of the incident surface P1 in the Y direction, and is shifted from the center toward the −X side in the X direction. Accordingly, the convex portion B may have a shape of a trimmed spherical cap, that is, a spherical cap from which a part protruding from the incident surface P1 is removed. The removed part specifically corresponds to a part of the spherical cap on the −X side of an YZ plane. The YZ plane is perpendicular to the bottom of the spherical cap shape and includes the −X side edge of the incident surface P1.

The exit surface P3 is straight in the Z direction (the direction normal to the second plane) and has a shape of a portion of a cylinder whose cross-section parallel to the XY plane (a second plane that is parallel to the normal of the first plane) has a shape of a quadratic curve (here, a circular arc shape). As a result, the incident light is not collimated by the reflecting surface P2 when viewed in the XY plane but is collimated so as to be in parallel with the outgoing optical axis X3 by the exit surface P3, thereby the outgoing light is parallel rays of light. Here, the incident optical axis X1 is perpendicular to the outgoing optical axis X3.

The incident surface P1 and the exit surface P3 may have an anti-reflection layer. The anti-reflection layer may be a well-known coating layer.

Figure 3A:
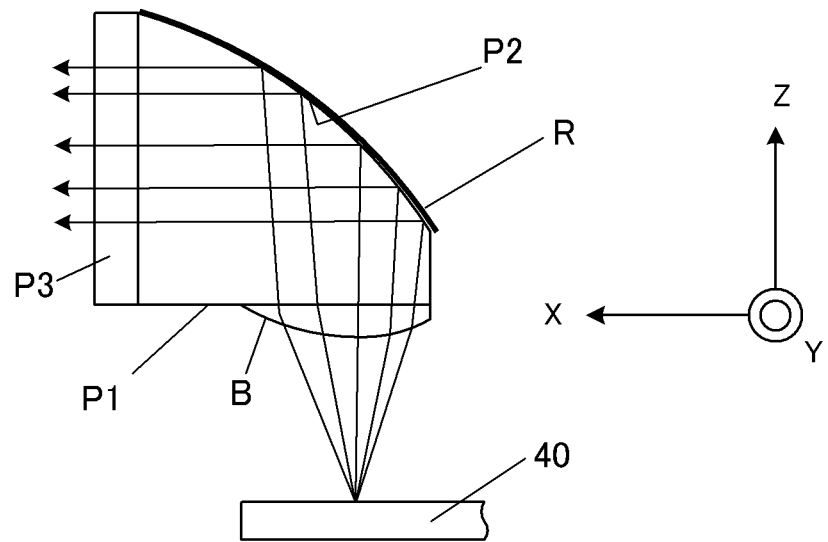
FIG. 3A is a diagram illustrating a light path in the irregular-shaped lens.
Figure 3B:
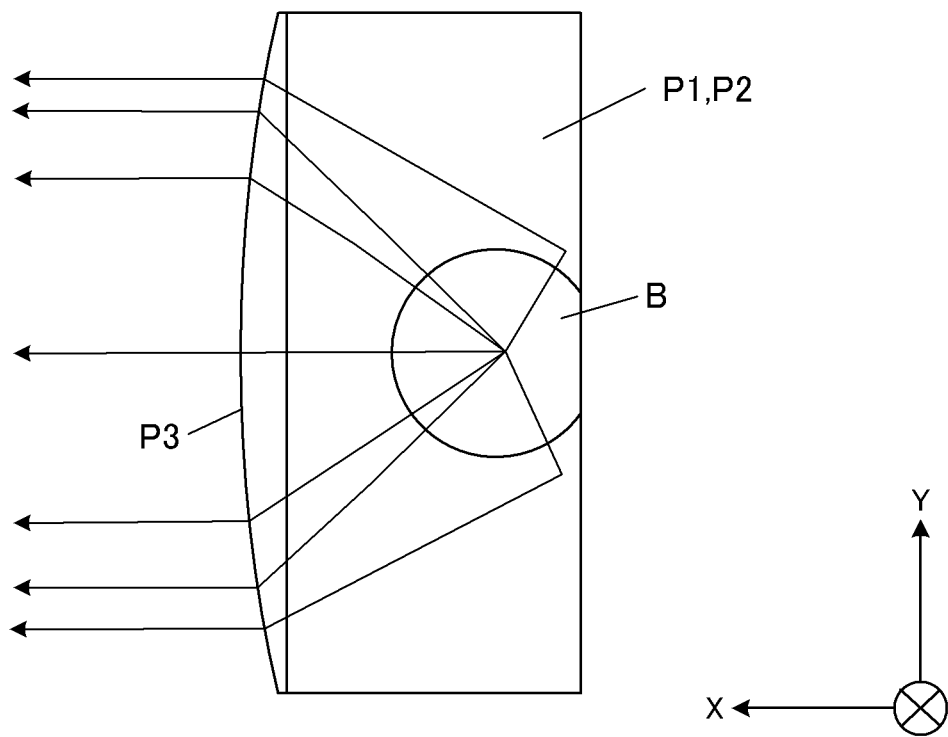
FIG. 3B is a diagram illustrating a light path in the irregular-shaped lens.

FIG. 3A and FIG. 3B are diagrams illustrating light paths in the irregular-shaped lens 26. FIG. 3A illustrates the light path in the XZ plane, and FIG. 3B illustrates the light path in the XY plane.

As shown in FIG. 3A, in the XZ plane, the light of the blue wavelength band from the fluorescent wheel 40 is collimated so as to be almost parallel rays of light, and is output from the exit surface P3 because of the convex surface of the convex portion B and the concave surface of the reflecting surface P2. As shown in FIG. 3B, in the XY plane, diffusion of the light of the blue wavelength band from the fluorescent wheel 40 is not reduced by reflection at the reflecting surface P2, but is reduced at the exit surface P3. Thus, the irregular-shaped lens 26 of this embodiment uses a combination of the reflecting surface P2 and exit surface P3 to emit collimated light.

As described above, the irregular-shaped lens 26, the optical lens of this embodiment, has the incident surface P1 where light enters, the reflecting surface P2 that internally reflects the light having entered from the incident surface P1, and the exit surface P3 of the light having been reflected by the reflecting surface P2. The reflecting surface P2 has a shape of a concave curved surface.

The conventional optical system including combination of a collimating lens and a mirror to output light in an appropriate direction has been facing a problem of difficulty in downsizing the system because the system requires a space to bend the light while suppressing diffusion of the light.

The irregular-shaped lens 26 in the above embodiment enables collimation and change in the optical axis direction due to reflection collectively and in a compact manner. In particular, since a convex portion of a conventional convex lens for collimation occupies a large space, it is necessary to leave a large space between such convex lens and other configurations such as mirrors. Therefore, according to the irregular-shaped lens 26 of this application, the components of the optical system can be arranged with less limitations. Furthermore, almost total reflection of the incident light inside the irregular-shaped lens 26 can cause less losses than the reflection using a conventional mirror. Therefore, the irregular-shaped lens 26 can change the direction of light while efficiently collimating light (reducing light diffusion).

The reflecting surface P2 has a quadratically curved surface. As a result, the irregular-shaped lens 26 having a simple shape can efficiently collimate the incident light and convert it into parallel rays of light.

The reflecting surface P2 has a shape of a portion of a cylinder (parabolic curved cylinder) surface that extends linearly in a direction of a normal to the first plane (Y direction). The cross-section of the cylinder surface has a quadratically curved (for example, parabolic) shape when cut by a plane parallel to the first plane (XZ plane). The exit surface P3 has a shape of a portion of a cylinder (circular cylinder) surface that extends linearly in a direction of a normal to the second plane (Z direction). The cross-section of the cylinder surface has a quadratically curved shape (circular arc) when cut by a plane parallel to the second plane (XY plane) parallel to a normal to the first plane.

Since the reflecting surface P2 and the exit surface P3 individually perform collimation of light in this manner, they each can be formed in a two dimensionally curved shape. Therefore, it is easy to manufacture the irregular-shaped lens and to efficiently set the path of the light.

The exit surface P3 has a shape of a portion of a cylinder surface. This allows the irregular-shaped lens 26 to convert the diffused incident light into parallel rays of light easily and in a short distance.

The irregular-shaped lens 26 emits parallel rays of light from the exit surface P3. In this way, the irregular-shaped lens 26 not only reflects and bends the light as a prism does, but also reduces diffusion of light and emits the light. Because a mirror and a collimating lens do not need to be arranged separately, it is possible to set the light path in a more space-saving manner.

The outgoing optical axis X3 of the light emitted from the exit surface P3 is perpendicular to the incident optical axis X1 of the incident light on the incident surface P1. That is, this irregular-shaped lens 26 can perform bending of the light path in 90 degrees and the light collimation (suppressing light diffusion to forma parallel rays of light) simultaneously in a space-saving manner.

The irregular-shaped lens 26 has the reflective layer R at least at a part of the outer side of the reflecting surface P2 to reflect light that is not reflected by the reflecting surface P2. The irregular-shaped lens 26 may not fully reflect the light depending on the angle of incidence, because the reflecting surface P2 is not flat, the phosphor layer is quite close to the incident surface P1, and so on. In such cases, the reflective layer R is preferably provided in a required area. With such a configuration, losses can be reduced as compared to reflection using a mirror only, and light can be reflected and collimated in a compact manner.

Furthermore, the incident surface P1 has the convex portion B of a spherical surface shape. This allows the irregular-shaped lens 26 to reduce diffusion degree of the diffused incident light to a certain extent. As a result, the reflecting surface P2 and the exit surface P3 can be shaped more freely.

The convex portion B has a shape of a trimmed spherical cap. If a spherical cap that is located corresponding to an incident area that efficiently allows light to reach the reflecting surface P2 protrudes from the incident surface P1, the convex portion B of the incident surface P1 may have a shape of the spherical cap from which this protruding portion is removed. This does not cause any optical inconvenience and allows the irregular-shaped lens 26 to have a compact shape without an extra protruding portion.

The light source device included in the projector 1 (projection device) of this embodiment includes the above-mentioned irregular-shaped lens 26 and the LD 11 that emits light that enters the irregular-shaped lens 26. In other words, this light source device can be compact and output light emitted by the LD11 in an appropriate direction.

The light source device also includes fluorescent wheel 40 having the phosphor layer that emits, based on a part of the light of the blue wavelength band emitted by the LD 11, light of the different wavelength band (green), and the diffusion transmission surface that transmits the light of the blue wavelength band while diffusing it. Light transmitted by the diffusion transmission surface enters the irregular-shaped lens 26. The quadratically curved cylinder surface of the reflecting surface P2 has its focus on the diffusion transmission surface (assuming a cross section of the reflecting surface P2 cut by the XZ plane in the drawing). In other words, by compactly setting a path for a part of the light to be emitted, the size of the entire light source device can be reduced.

The light source device also includes the first light guide that guides the light emitted through the irregular-shaped lens 26, the second light guide that guides the light emitted by the phosphor layer, and the merged light guide 50 where the light through the first light guide and the light through the second light guide are merged and guided. That is, when light of a certain wavelength and light of another wavelength pass through different paths to be merged, one of the paths, in particular the longer path, can be compactly set using the irregular-shaped lens 26 so that the size of the light source device can be reduced.

The present invention is not limited to the above embodiment, and various changes can be made.

For example, the reflecting surface P2 and the exit surface P3 have respective quadratically curved cylinder surface shapes so as to make the light rays parallel to respective planes that are orthogonal to each other in the above embodiment, but the present invention is not limited thereto. The reflecting surface P2 may have a quadratically curved surface such as a paraboloid to orient the light rays parallel to a straight line at a time. In this case, the exit surface P3 may be just a flat surface. Alternatively, reflecting surface P2 and the exit surface P3 each may be such a quadratically curved surface that collimates light step by step. The reflecting surface P2 and the exit surface P3 are not limited to the quadratically curved surfaces, but may be, for example, third-order or higher-order surfaces such that fine aberrations are reduced, and the like.

In the above-described embodiment, parallel rays of light are emitted as an example, but the present invention is not limited thereto, as long as diffusion of the emitted light is suppressed compared to that of the incident light. Alternatively, the light may be emitted in a more converged manner.

In the above-described embodiment, the irregular-shaped lens 26 bends the optical axis at a right angle and has the exit surface P3 and the incident surface P1 perpendicular to each other, but the present invention is not limited thereto. The irregular-shaped lens can be configured to bend the optical axis of the outgoing light by appropriately 90 degrees taking manufacturing errors into account, or any other angle.

In the above-described embodiment, the irregular-shaped lens 26 has the reflecting layer R, but does not have to have the reflecting layer R if not necessary, considering the relationship between the incident angle of the incident light, the reflection angle at the reflecting surface P2, and the material (refractive index) of the irregular-shaped lens 26.

In the above-described embodiment, the incident surface P1 has a convex portion B having a spherical surface shape to suppress light diffusion, but the present invention is not limited thereto. When the incident light is not diffused so much, the incident surface P1 may not have the convex portion B. The incident surface of the convex portion B may have any other quadratically curved surface shape. The convex portion B may not have a partially removed spherical cap shape, depending on the position and size of the spherical cap shape that constitutes the convex portion B.

In the above-described embodiment, the light emitted by the LD 11 enters the irregular-shaped lens 26, but the present invention is not limited thereto. Any other light source may be used.

In the above-described embodiment, light of the green wavelength band is emitted by the phosphor layer, but the present invention is not limited thereto. There may be a further light source that emits light of the green wavelength band. Alternatively, light of the green wavelength band may be generated not by the phosphor layer but by a filter or the like.

In the above-described embodiment, light of the blue wavelength band enters the irregular-shaped lens 26, but light of other wavelength bands may enter the irregular-shaped lens 26. Also, the incident light is not limited to light of a single wavelength band. In this case, the incident angle of the light may be different for each wavelength band.

In the above-described embodiment, the light source device emits light of multiple wavelength bands, but may emit light of only a single wavelength band. Furthermore, the light is not limited to visible light as long as it is light of a wavelength band that can pass through a lens and can be reflected by a mirror. For example, infrared light may be included. Also, light of multiple wavelength bands does not necessarily have to be merged and output.

In the above-described embodiment, the light source device is one for the projector 1, but the present invention is not limited thereto. The light source device may be used in various applications such as lighting devices, signs, inspection devices, and the like.

In addition, the specific configuration, contents and procedures of processing, and the like described in the above embodiment can be changed as necessary without departing from the gist of the present invention.

Although several embodiments of the present invention have been described above, the scope of the present invention is not limited to the embodiments described above, but includes the scope of the present invention described in the claims and the scope of their equivalents.

What is claimed is:

1. An optical lens comprising:
   an incident surface of light;
   a reflecting surface that internally reflects light that has entered through the incident surface; and
   an exit surface of light that has been reflected by the reflecting surface, wherein
   reflecting surface has a concave curved surface, and
   at least a part of the incident surface has a protrusion having a spherical surface shape; and
   wherein the protrusion protrudes in a direction opposite to the reflecting surface.

2. The optical lens according to claim 1, wherein the protrusion has a shape of a trimmed spherical cap.

3. The optical lens according to claim 1, wherein the protrusion has a shape of a trimmed spherical cap from which a part protruding from the incident surface is removed.

4. The optical lens according to claim 1, wherein
   the protrusion is located at a center of the incident surface in a direction normal to a first plane, the first plane being parallel to both an incident optical axis of incident light on the incident surface and an outgoing optical axis of outgoing light from the exit surface, and
   the protrusion is shifted from a center of the incident surface in a direction of the outgoing optical axis toward a side opposite to the exit surface.

5. The optical lens according to claim 1, wherein the reflecting surface has a quadratically curved surface shape.

6. The optical lens according to claim 5, wherein
   the reflecting surface has a shape of a portion of a first cylinder surface that has a quadratically curved shape in a plane parallel to a first plane and that extends linearly in a direction of a normal to the first plane, and
   the exit surface has a shape of a portion of a second cylinder surface that has a quadratically curved shape in a plane parallel to a second plane and that extends linearly in a direction of a normal to the second plane, the second plane being parallel to the direction of the normal to the first plane.

7. The optical lens according to claim 6, wherein the exit surface has a shape of a portion of a cylinder surface.

8. The optical lens according to claim 1, wherein the optical lens emits parallel rays of light from the exit surface.

9. The optical lens according to claim 1, wherein an outgoing optical axis of outgoing light from the exit surface is perpendicular to an incident optical axis of incident light on the incident surface.

10. The optical lens according to claim 1, further comprising:
    a reflective layer that is provided on at least a part of an outer side of the reflecting surface and reflects light that has not been reflected by the reflecting surface.

11. A light source device comprising:
    the optical lens according to claim 1; and
    a light source that emits light that enters the optical lens.

12. The light source device according to claim 11, further comprising:
    a phosphor layer that emits, based on a part of light that has been emitted by the light source, light of a wavelength different from a wavelength of light that has been emitted by the light source; and
    a diffusion transmission surface that is on the same plane as the phosphor layer and diffuses and transmits light other than the part of light, wherein
    the light that has been transmitted by the diffusion transmission surface enters the optical lens, and
    the concave curved surface of the reflecting surface has a focus on a plane including the diffusion transmission surface.

13. The light source device according to claim 12, further comprising:
    a first light guide that guides light that has been emitted from the optical lens;
    a second light guide that guides light that has been emitted by the phosphor layer; and a merged light guide where light through the first light guide and light through the second light guide are merged and guided.

\* \* \* \* \*